US009088582B2

(12) United States Patent
Archer et al.

(10) Patent No.: US 9,088,582 B2
(45) Date of Patent: *Jul. 21, 2015

(54) TOKEN-BASED FLOW CONTROL OF MESSAGES IN A PARALLEL COMPUTER

(71) Applicant: INTERNATIONAL BUSINESS MACHINES CORPORATION, Armonk, NY (US)

(72) Inventors: Charles J. Archer, Rochester, MN (US); James E. Carey, Rochester, MN (US); Philip J. Sanders, Rochester, MN (US); Brian E. Smith, Knoxville, TN (US)

(73) Assignee: International Business Machines Corporation, Armonk, NY (US)

( * ) Notice: Subject to any disclaimer, the term of this patent is extended or adjusted under 35 U.S.C. 154(b) by 179 days.

This patent is subject to a terminal disclaimer.

(21) Appl. No.: 13/766,515

(22) Filed: Feb. 13, 2013

(65) Prior Publication Data

US 2014/0192652 A1   Jul. 10, 2014

Related U.S. Application Data

(63) Continuation of application No. 13/738,657, filed on Jan. 10, 2013.

(51) Int. Cl.
*H04L 12/26* (2006.01)
*H04L 29/08* (2006.01)
*H04L 12/819* (2013.01)

(52) U.S. Cl.
CPC .......... *H04L 67/1012* (2013.01); *H04L 47/215* (2013.01)

(58) Field of Classification Search
CPC .......................... H04L 47/215; H04L 67/1012
USPC ................ 709/223, 226; 370/229, 235, 235.1
See application file for complete search history.

(56) References Cited

U.S. PATENT DOCUMENTS

| 5,265,207 A | 11/1993 | Zak et al. |
| 5,574,931 A * | 11/1996 | Letellier et al. .................. 712/11 |
| 5,862,397 A * | 1/1999 | Essafi et al. ..................... 712/22 |
| 2011/0213946 A1 | 9/2011 | Ajima et al. |

* cited by examiner

*Primary Examiner* — Mohamed Wasel
(74) *Attorney, Agent, or Firm* — Kennedy Lenart Spraggins LLP

(57) ABSTRACT

Token-based flow control of messages in a parallel computer, the parallel computer including a plurality of compute nodes, each compute node including one or more computer processors, including: allocating, by a token administration module to a plurality of the computer processors in the parallel computer, a number of data communications tokens; identifying all communicators executing on each computer processor, where each communicator is participating in a distinct parallel operation executing on the parallel computer; allocating, to the communicators, the data communications tokens; determining, by a communicator attempting to send data to the destination, whether the communicator has enough available data communications tokens to send the data to the destination; and responsive to determining that the communicator has enough available data communications tokens to send the data, sending, by the communicator, the data to the destination.

7 Claims, 8 Drawing Sheets

TOKEN-BASED FLOW CONTROL OF MESSAGES IN A PARALLEL COMPUTER

CROSS-REFERENCE TO RELATED APPLICATION

This application is a continuation application of and claims priority from U.S. patent application Ser. No. 13/738,657, filed on Jan. 10, 2013.

BACKGROUND OF THE INVENTION

1. Field of the Invention

The field of the invention is data processing, or, more specifically, methods, apparatus, and products for token-based flow control of messages in a parallel computer.

2. Description of Related Art

The development of the EDVAC computer system of 1948 is often cited as the beginning of the computer era. Since that time, computer systems have evolved into extremely complicated devices. Today's computers are much more sophisticated than early systems such as the EDVAC. Computer systems typically include a combination of hardware and software components, application programs, operating systems, processors, buses, memory, input/output devices, and so on. As advances in semiconductor processing and computer architecture push the performance of the computer higher and higher, more sophisticated computer software has evolved to take advantage of the higher performance of the hardware, resulting in computer systems today that are much more powerful than just a few years ago.

Current parallel computers are running a number of processes that just a few years ago would have seemed unimaginable. For example, current parallel computers may execute millions of processes simultaneously. Processes executing on compute nodes in the parallel computer often send each other data. The flow control of that data is not always even. That is, some destinations receive more data than others. If a particular destination receives more data that it can process, efficiency is harmed for that destination as well as senders of the data.

SUMMARY OF THE INVENTION

Methods, apparatus, and products for token-based flow control of messages in a parallel computer executing a plurality of parallel operations, the parallel computer including a plurality of compute nodes, each compute node including one or more computer processors, including: allocating, by a token administration module to a plurality of the computer processors in the parallel computer, a number of data communications tokens, wherein each data communications token represents an amount of data that a computer processor may send to a destination and the number of data communications tokens allocated to each processor is determined in dependence upon token distribution rules; identifying, by the token administration module, all communicators executing on the computer processor, wherein each communicator is participating in a distinct parallel operation executing on the parallel computer; allocating, by the token administration module to the communicators executing on the computer processor, the data communications tokens; determining, by a communicator attempting to send data to the destination, whether the communicator has enough available data communications tokens to send the data to the destination; and responsive to determining that the communicator has enough available data communications tokens to send the data, sending, by the communicator, the data to the destination.

The foregoing and other objects, features and advantages of the invention will be apparent from the following more particular descriptions of example embodiments of the invention as illustrated in the accompanying drawings wherein like reference numbers generally represent like parts of example embodiments of the invention.

DETAILED DESCRIPTION OF EXAMPLE EMBODIMENTS

Figure 1:
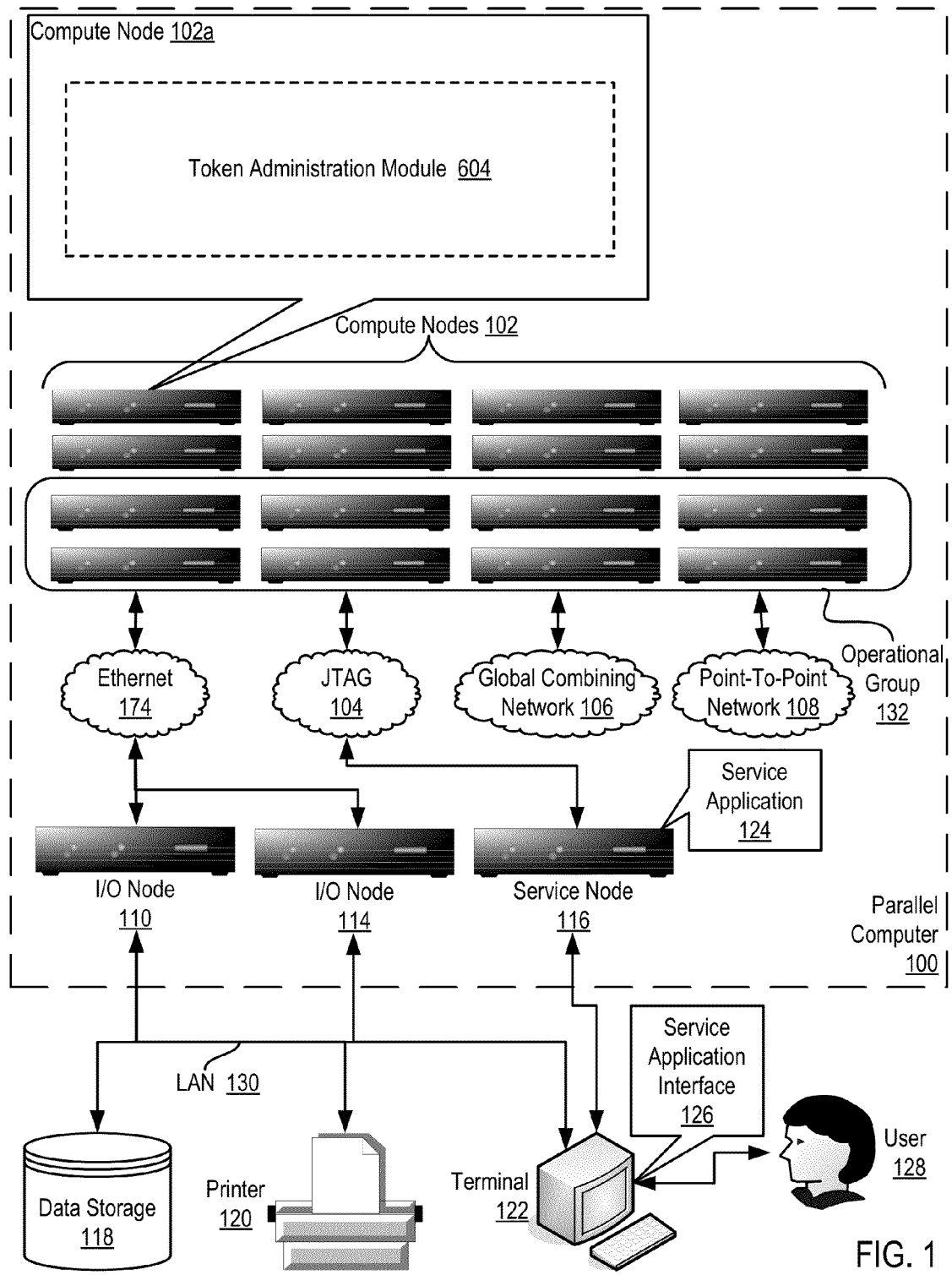
FIG. 1 illustrates an example system for token-based flow control of messages in a parallel computer according to embodiments of the present invention.

Example methods, apparatus, and products for token-based flow control of messages in a parallel computer in accordance with the present invention are described with reference to the accompanying drawings, beginning with FIG. 1. FIG. 1 illustrates an example system for token-based flow control of messages in a parallel computer according to embodiments of the present invention. The system of FIG. 1 includes a parallel computer (100), non-volatile memory for the computer in the form of a data storage device (118), an output device for the computer in the form of a printer (120), and an input/output device for the computer in the form of a computer terminal (122).

The parallel computer (100) in the example of FIG. 1 includes a plurality of compute nodes (102). The compute nodes (102) are coupled for data communications by several independent data communications networks including a high speed Ethernet network (174), a Joint Test Action Group ('JTAG') network (104), a global combining network (106) which is optimized for collective operations using a binary tree network topology, and a point-to-point network (108), which is optimized for point-to-point operations using a torus network topology. The global combining network (106) is a data communications network that includes data communications links connected to the compute nodes (102) so as to organize the compute nodes (102) as a binary tree. Each data communications network is implemented with data communications links among the compute nodes (102). The data communications links provide data communications for parallel operations among the compute nodes (102) of the parallel computer (100).

The compute nodes (102) of the parallel computer (100) are organized into at least one operational group (132) of compute nodes for collective parallel operations on the parallel computer (100). Each operational group (132) of compute nodes is the set of compute nodes upon which a collective parallel operation executes. Each compute node in the operational group (132) is assigned a unique rank that identifies the particular compute node in the operational group (132). Collective operations are implemented with data communications among the compute nodes of an operational group. Collective operations are those functions that involve all the compute nodes of an operational group (132). A collective operation is an operation, a message-passing computer program instruction that is executed simultaneously, that is, at approximately the same time, by all the compute nodes in an operational group (132) of compute nodes. Such an operational group (132) may include all the compute nodes (102) in a parallel computer (100) or a subset all the compute nodes (102). Collective operations are often built around point-to-point operations. A collective operation requires that all processes on all compute nodes within an operational group (132) call the same collective operation with matching arguments. A 'broadcast' is an example of a collective operation for moving data among compute nodes of an operational group. A 'reduce' operation is an example of a collective operation that executes arithmetic or logical functions on data distributed among the compute nodes of an operational group (132). An operational group (132) may be implemented as, for example, an MPI 'communicator.'

'MPI' refers to 'Message Passing Interface,' a prior art parallel communications library, a module of computer program instructions for data communications on parallel computers. Examples of prior-art parallel communications libraries that may be improved for use in systems configured according to embodiments of the present invention include MPI and the 'Parallel Virtual Machine' ('PVM') library. PVM was developed by the University of Tennessee, The Oak Ridge National Laboratory and Emory University. MPI is promulgated by the MPI Forum, an open group with representatives from many organizations that define and maintain the MPI standard. MPI at the time of this writing is a de facto standard for communication among compute nodes running a parallel program on a distributed memory parallel computer. This specification sometimes uses MPI terminology for ease of explanation, although the use of MPI as such is not a requirement or limitation of the present invention.

Some collective operations have a single originating or receiving process running on a particular compute node in an operational group (132). For example, in a 'broadcast' collective operation, the process on the compute node that distributes the data to all the other compute nodes is an originating process. In a 'gather' operation, for example, the process on the compute node that received all the data from the other compute nodes is a receiving process. The compute node on which such an originating or receiving process runs is referred to as a logical root.

Most collective operations are variations or combinations of four basic operations: broadcast, gather, scatter, and reduce. The interfaces for these collective operations are defined in the MPI standards promulgated by the MPI Forum. Algorithms for executing collective operations, however, are not defined in the MPI standards. In a broadcast operation, all processes specify the same root process, whose buffer contents will be sent. Processes other than the root specify receive buffers. After the operation, all buffers contain the message from the root process.

A scatter operation, like the broadcast operation, is also a one-to-many collective operation. In a scatter operation, the logical root divides data on the root into segments and distributes a different segment to each compute node in the operational group (132). In scatter operation, all processes typically specify the same receive count. The send arguments are only significant to the root process, whose buffer actually contains sendcount*N elements of a given datatype, where N is the number of processes in the given group of compute nodes. The send buffer is divided and dispersed to all processes (including the process on the logical root). Each compute node is assigned a sequential identifier termed a 'rank.' After the operation, the root has sent sendcount data elements to each process in increasing rank order. Rank 0 receives the first sendcount data elements from the send buffer. Rank 1 receives the second sendcount data elements from the send buffer, and so on.

A gather operation is a many-to-one collective operation that is a complete reverse of the description of the scatter operation. That is, a gather is a many-to-one collective operation in which elements of a datatype are gathered from the ranked compute nodes into a receive buffer in a root node.

A reduction operation is also a many-to-one collective operation that includes an arithmetic or logical function performed on two data elements. All processes specify the same 'count' and the same arithmetic or logical function. After the reduction, all processes have sent count data elements from compute node send buffers to the root process. In a reduction operation, data elements from corresponding send buffer locations are combined pair-wise by arithmetic or logical operations to yield a single corresponding element in the receive buffer of a root process. Application specific reduction operations can be defined at runtime. Parallel communications libraries may support predefined operations. MPI, for example, provides the following predefined reduction operations:

| | |
|---|---|
| MPI_MAX | maximum |
| MPI_MIN | minimum |
| MPI_SUM | sum |
| MPI_PROD | product |
| MPI_LAND | logical and |
| MPI_BAND | bitwise and |
| MPI_LOR | logical or |
| MPI_BOR | bitwise or |
| MPI_LXOR | logical exclusive or |
| MPI_BXOR | bitwise exclusive or |

In addition to compute nodes, the parallel computer (100) includes input/output ('I/O') nodes (110, 114) coupled to compute nodes (102) through the global combining network (106). The compute nodes (102) in the parallel computer (100) may be partitioned into processing sets such that each compute node in a processing set is connected for data communications to the same I/O node. Each processing set, therefore, is composed of one I/O node and a subset of compute nodes (102). The ratio between the number of compute nodes to the number of I/O nodes in the entire system typically depends on the hardware configuration for the parallel computer (100). For example, in some configurations, each processing set may be composed of eight compute nodes and one I/O node. In some other configurations, each processing set may be composed of sixty-four compute nodes and one I/O node. Such example are for explanation only, however, and not for limitation. Each I/O node provides I/O services between compute nodes (102) of its processing set and a set of I/O devices. In the example of FIG. 1, the I/O nodes (110, 114) are connected for data communications I/O devices (118, 120, 122) through local area network ('LAN') (130) implemented using high-speed Ethernet.

The parallel computer (100) of FIG. 1 also includes a service node (116) coupled to the compute nodes through one of the networks (104). Service node (116) provides services common to pluralities of compute nodes, administering the configuration of compute nodes, loading programs into the compute nodes, starting program execution on the compute nodes, retrieving results of program operations on the compute nodes, and so on. Service node (116) runs a service application (124) and communicates with users (128) through a service application interface (126) that runs on computer terminal (122).

The parallel computer (100) of FIG. 1 operates generally for token-based flow control of messages, the parallel computer including a plurality of compute nodes (100). Such a parallel computer (100) is typically composed of many compute nodes, but for ease of explanation one of the compute nodes (102a) in this example are referenced in particular. The compute node (102a) includes a token administration module (604) for token-based flow control of messages in a parallel computer, the parallel computer including a plurality of compute nodes (100). The token administration module (604) of FIG. 1 may be embodied as a module of computer program instructions executing on computer hardware. The token administration module (604) of FIG. 1 can implement token-based flow control of messages in a parallel computer (100) by: allocating a number of data communications tokens to a plurality of the computer processors in the parallel computer, identifying all communicators executing on the computer processor, and allocating the data communications tokens to the communicators executing on the computer processor. Although the token administration module (604) is depicted as residing on compute node (102a), readers will appreciate that the token administration module (604) may reside on one or more of the compute nodes (102) in the parallel computer, including any of the I/O nodes (110, 114) or the service node (116).

The arrangement of nodes, networks, and I/O devices making up the example apparatus illustrated in FIG. 1 are for explanation only, not for limitation of the present invention. Systems configured for token-based flow control of messages in a parallel computer according to embodiments of the present invention may include additional nodes, networks, devices, and architectures, not shown in FIG. 1, as will occur to those of skill in the art. The parallel computer (100) in the example of FIG. 1 includes sixteen compute nodes (102). Parallel computers (102) configured for token-based flow control of messages according to embodiments of the present invention sometimes include thousands of compute nodes. In addition to Ethernet (174) and JTAG (104), networks in such data processing systems may support many data communications protocols including for example TCP (Transmission Control Protocol), IP (Internet Protocol), and others as will occur to those of skill in the art.

Various embodiments of the present invention may be implemented on a variety of hardware platforms in addition to those illustrated in FIG. 1.

Token-based flow control of messages in a parallel computer according to embodiments of the present invention is generally implemented on a parallel computer that includes a plurality of compute nodes organized for collective operations through at least one data communications network. In fact, such computers may include thousands of such compute nodes. Each compute node is in turn itself a kind of computer composed of one or more computer processing cores, its own computer memory, and its own input/output adapters. For further explanation, therefore, FIG. 2 sets forth a block diagram of an example compute node (102) useful in token-based flow control of messages in a parallel computer according to embodiments of the present invention. The compute node (102) of FIG. 2 includes a plurality of processing cores (165) as well as RAM (156). The processing cores (165) of FIG. 2 may be configured on one or more integrated circuit dies. Processing cores (165) are connected to RAM (156) through a high-speed memory bus (155) and through a bus adapter (194) and an extension bus (168) to other components of the compute node.

Figure 2:
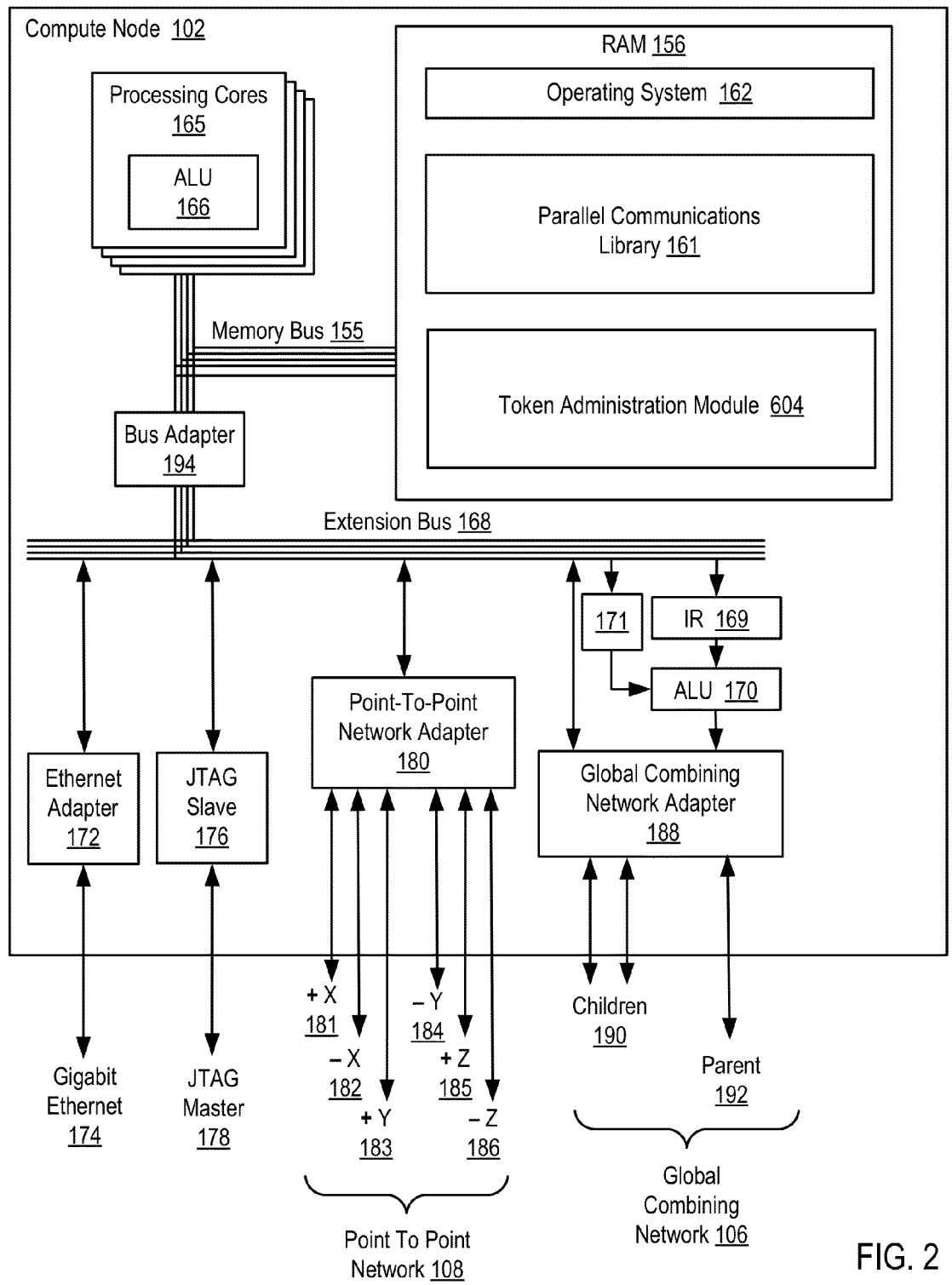
FIG. 2 sets forth a block diagram of an example compute node useful in token-based flow control of messages in a parallel computer according to embodiments of the present invention.

In the example of FIG. 2, each processing core (165) supports the execution of one or more communicators. Each communicator represents a set of computer program instructions executing on the processing core (165). The set of computer program instructions executing on the processing core (165) may include computer program instructions for sending messages between each communicator executing on a particular processing core (165), computer program instructions for sending messages between communicators on different processing cores, computer program instructions for sending messages between communicators executing on distinct compute nodes, computer program instructions for performing collective operations, and so on.

Stored in RAM (156) is a parallel communications library (161), a library of computer program instructions that carry out parallel communications among compute nodes, including point-to-point operations as well as collective operations. A library of parallel communications routines may be developed from scratch for use in systems according to embodiments of the present invention, using a traditional programming language such as the C programming language, and using traditional programming methods to write parallel communications routines that send and receive data among nodes on two independent data communications networks. Alternatively, existing prior art libraries may be improved to operate according to embodiments of the present invention. Examples of prior-art parallel communications libraries include the MPI library and the 'Parallel Virtual Machine' ('PVM') library.

Also stored in RAM (156) is an operating system (162), a module of computer program instructions and routines for an application program's access to other resources of the compute node. It is typical for the parallel communications library in a compute node of a parallel computer to run a single thread of execution with no user login and no security issues because the thread is entitled to complete access to all resources of the node. The quantity and complexity of tasks to be performed by an operating system on a compute node in a parallel computer therefore are smaller and less complex than those of an operating system on a serial computer with many threads running simultaneously. In addition, there is no video I/O on the compute node (102) of FIG. 2, another factor that decreases the demands on the operating system. The operating system (162) may therefore be quite lightweight by comparison with operating systems of general purpose computers, a pared down version as it were, or an operating system developed specifically for operations on a particular parallel computer. Operating systems that may usefully be improved, simplified, for use in a compute node include UNIX™, Linux™, Windows XP™, AIX™, IBM's i5/OS™, and others as will occur to those of skill in the art.

Also stored in RAM (156) is a token administration module (604) for use in token-based flow control of messages in a parallel computer (100). The token administration module (604) of FIG. 2 includes computer program instructions that, when executed, can be used for token-based flow control of messages in a parallel computer (100) by: allocating a number of data communications tokens to a plurality of the computer processors in the parallel computer, identifying all communicators executing on the computer processor, and allocating the data communications tokens to the communicators executing on the computer processor.

In the example of FIG. 2, token-based flow control of messages in a parallel computer (100) may further be carried out by determining, by a communicator attempting to send data to the destination, whether the communicator has enough available data communications tokens to send the data to the destination. Token-based flow control of messages in a parallel computer (100) may further be carried out by sending, by the communicator, the data to the destination.

The example compute node (102) of FIG. 2 includes several communications adapters (172, 176, 180, 188) for implementing data communications with other nodes of a parallel computer. Such data communications may be carried out serially through RS-232 connections, through external buses such as USB, through data communications networks such as IP networks, and in other ways as will occur to those of skill in the art. Communications adapters implement the hardware level of data communications through which one computer sends data communications to another computer, directly or through a network. Examples of communications adapters useful in apparatus useful for token-based flow control of messages in a parallel computer include modems for wired communications, Ethernet (IEEE 802.3) adapters for wired network communications, and 802.11b adapters for wireless network communications.

The data communications adapters in the example of FIG. 2 include a Gigabit Ethernet adapter (172) that couples example compute node (102) for data communications to a Gigabit Ethernet (174). Gigabit Ethernet is a network transmission standard, defined in the IEEE 802.3 standard, that provides a data rate of 1 billion bits per second (one gigabit). Gigabit Ethernet is a variant of Ethernet that operates over multimode fiber optic cable, single mode fiber optic cable, or unshielded twisted pair.

The data communications adapters in the example of FIG. 2 include a JTAG Slave circuit (176) that couples example compute node (102) for data communications to a JTAG Master circuit (178). JTAG is the usual name used for the IEEE 1149.1 standard entitled Standard Test Access Port and Boundary-Scan Architecture for test access ports used for testing printed circuit boards using boundary scan. JTAG is so widely adapted that, at this time, boundary scan is more or less synonymous with JTAG. JTAG is used not only for printed circuit boards, but also for conducting boundary scans of integrated circuits, and is also useful as a mechanism for debugging embedded systems, providing a convenient alternative access point into the system. The example compute node of FIG. 2 may be all three of these: It typically includes one or more integrated circuits installed on a printed circuit board and may be implemented as an embedded system having its own processing core, its own memory, and its own I/O capability. JTAG boundary scans through JTAG Slave (176) may efficiently configure processing core registers and memory in compute node (102) for use in dynamically reassigning a connected node to a block of compute nodes useful in systems for token-based flow control of messages in a parallel computer according to embodiments of the present invention.

The data communications adapters in the example of FIG. 2 include a Point-To-Point Network Adapter (180) that couples example compute node (102) for data communications to a network (108) for point-to-point message passing operations such as, for example, a network configured as a three-dimensional torus or mesh. The Point-To-Point Adapter (180) provides data communications in six directions on three communications axes, x, y, and z, through six bidirectional links: +x (181), −x (182), +y (183), −y (184), +z (185), and −z (186).

The data communications adapters in the example of FIG. 2 include a Global Combining Network Adapter (188) that couples example compute node (102) for data communications to a global combining network (106) for collective message passing operations such as, for example, a network configured as a binary tree. The Global Combining Network Adapter (188) provides data communications through three bidirectional links for each global combining network (106) that the Global Combining Network Adapter (188) supports. In the example of FIG. 2, the Global Combining Network Adapter (188) provides data communications through three bidirectional links for global combining network (106): two to children nodes (190) and one to a parent node (192).

The example compute node (102) includes multiple arithmetic logic units ('ALUs'). Each processing core (165) includes an ALU (166), and a separate ALU (170) is dedicated to the exclusive use of the Global Combining Network Adapter (188) for use in performing the arithmetic and logical functions of reduction operations, including an all reduce operation. Computer program instructions of a reduction routine in a parallel communications library (161) may latch an instruction for an arithmetic or logical function into an instruction register (169). When the arithmetic or logical function of a reduction operation is a 'sum' or a 'logical OR,' for example, the collective operations adapter (188) may execute the arithmetic or logical operation by use of the ALU (166) in the processing core (165) or, typically much faster, by use of the dedicated ALU (170) using data provided by the nodes (190, 192) on the global combining network (106) and data provided by processing cores (165) on the compute node (102).

Often when performing arithmetic operations in the global combining network adapter (188), however, the global combining network adapter (188) only serves to combine data received from the children nodes (190) and pass the result up the network (106) to the parent node (192). Similarly, the global combining network adapter (188) may only serve to transmit data received from the parent node (192) and pass the data down the network (106) to the children nodes (190). That is, none of the processing cores (165) on the compute node (102) contribute data that alters the output of ALU (170), which is then passed up or down the global combining network (106). Because the ALU (170) typically does not output any data onto the network (106) until the ALU (170) receives input from one of the processing cores (165), a processing core (165) may inject the identity element into the dedicated ALU (170) for the particular arithmetic operation being perform in the ALU (170) in order to prevent alteration of the output of the ALU (170). Injecting the identity element into the ALU, however, often consumes numerous processing cycles. To further enhance performance in such cases, the example compute node (102) includes dedicated hardware (171) for injecting identity elements into the ALU (170) to reduce the amount of processing core resources required to prevent alteration of the ALU output. The dedicated hardware (171) injects an identity element that corresponds to the particular arithmetic operation performed by the ALU. For example, when the global combining network adapter (188) performs a bitwise OR on the data received from the children nodes (190), dedicated hardware (171) may inject zeros into the ALU (170) to improve performance throughout the global combining network (106).

Figure 3A:
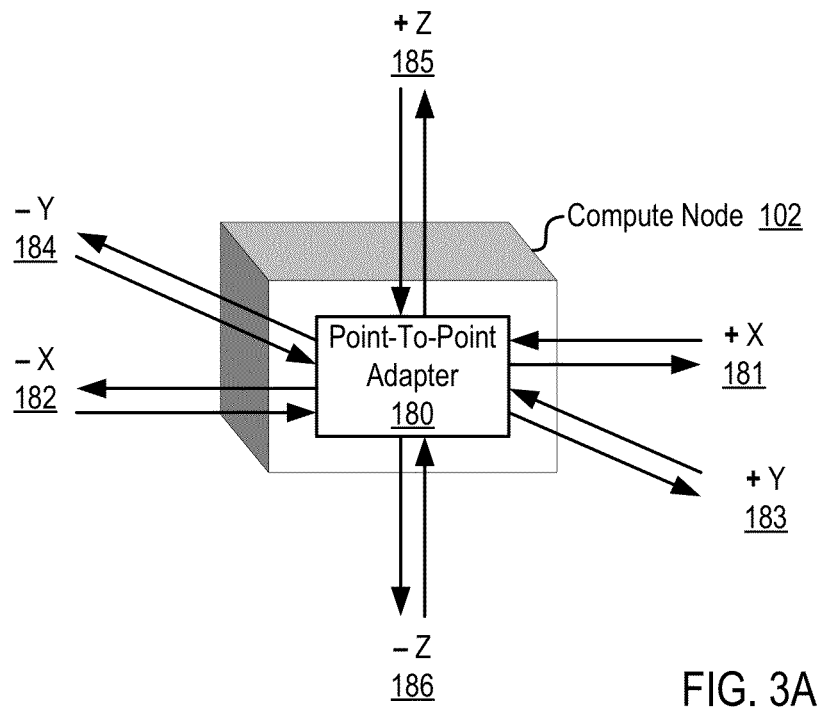
FIG. 3A sets forth a block diagram of an example Point-To-Point Adapter useful in systems for token-based flow control of messages in a parallel computer according to embodiments of the present invention.
Figure 3B:
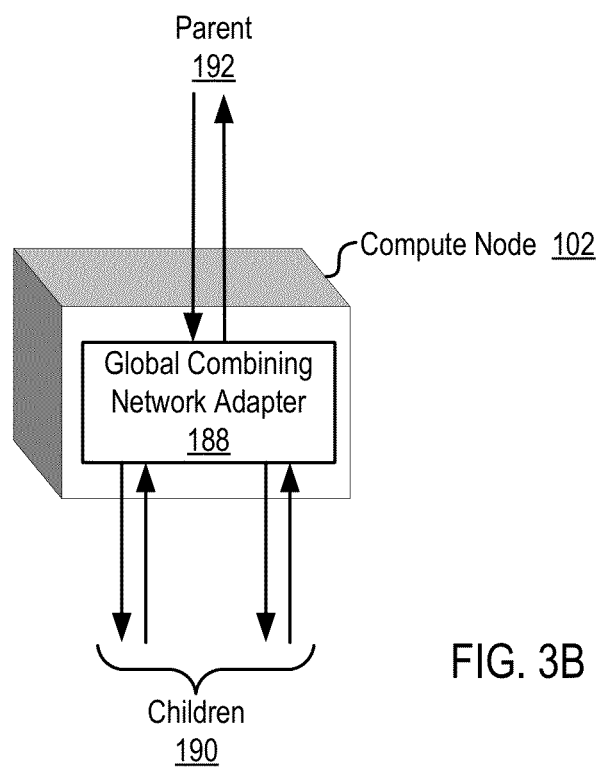
FIG. 3B sets forth a block diagram of an example Global Combining Network Adapter useful in systems for token-based flow control of messages in a parallel computer according to embodiments of the present invention.

For further explanation, FIG. 3A sets forth a block diagram of an example Point-To-Point Adapter (180) useful in systems for token-based flow control of messages in a parallel computer according to embodiments of the present invention. The Point-To-Point Adapter (180) is designed for use in a data communications network optimized for point-to-point operations, a network that organizes compute nodes in a three-dimensional torus or mesh. The Point-To-Point Adapter (180) in the example of FIG. 3A provides data communication along an x-axis through four unidirectional data communications links, to and from the next node in the −x direction (182) and to and from the next node in the +x direction (181). The Point-To-Point Adapter (180) of FIG. 3A also provides data communication along a y-axis through four unidirectional data communications links, to and from the next node in the −y direction (184) and to and from the next node in the +y direction (183). The Point-To-Point Adapter (180) of FIG. 3A also provides data communication along a z-axis through four unidirectional data communications links, to and from the next node in the −z direction (186) and to and from the next node in the +z direction (185). For further explanation, FIG. 3B sets forth a block diagram of an example Global Combining Network Adapter (188) useful in systems for token-based flow control of messages in a parallel computer according to embodiments of the present invention. The Global Combining Network Adapter (188) is designed for use in a network optimized for collective operations, a network that organizes compute nodes of a parallel computer in a binary tree. The Global Combining Network Adapter (188) in the example of FIG. 3B provides data communication to and from children nodes of a global combining network through four unidirectional data communications links (190), and also provides data communication to and from a parent node of the global combining network through two unidirectional data communications links (192).

Figure 4:
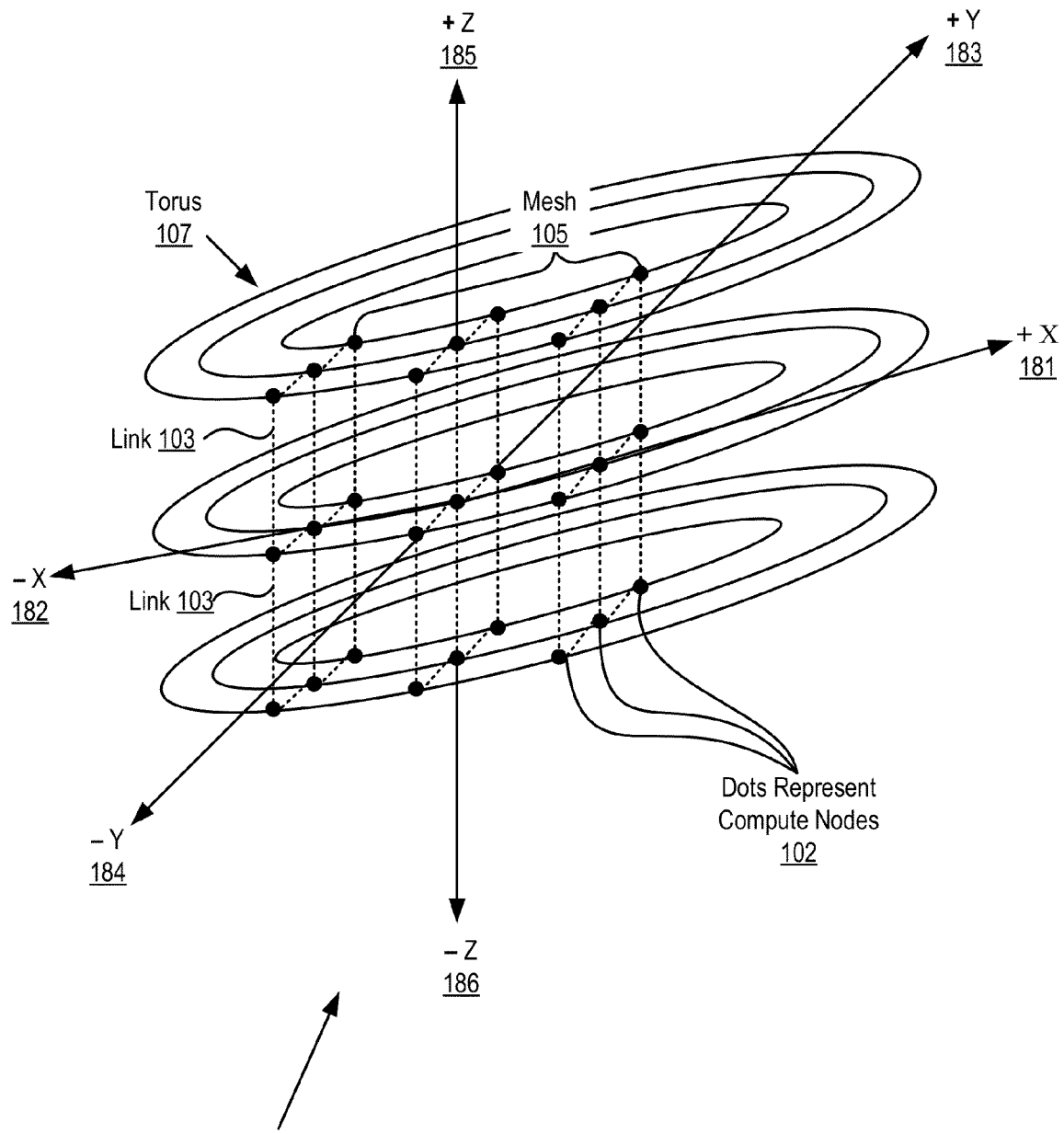
FIG. 4 sets forth a line drawing illustrating an example data communications network optimized for point-to-point operations useful in systems capable of token-based flow control of messages in a parallel computer according to embodiments of the present invention.

For further explanation, FIG. 4 sets forth a line drawing illustrating an example data communications network (108) optimized for point-to-point operations useful in systems capable of token-based flow control of messages in a parallel computer according to embodiments of the present invention. In the example of FIG. 4, dots represent compute nodes (102) of a parallel computer, and the dotted lines between the dots represent data communications links (103) between compute nodes. The data communications links are implemented with point-to-point data communications adapters similar to the one illustrated for example in FIG. 3A, with data communications links on three axis, x, y, and z, and to and fro in six directions +x (181), −x (182), +y (183), −y (184), +z (185), and −z (186). The links and compute nodes are organized by this data communications network optimized for point-to-point operations into a three dimensional mesh (105). The mesh (105) has wrap-around links on each axis that connect the outermost compute nodes in the mesh (105) on opposite sides of the mesh (105). These wrap-around links form a torus (107). Each compute node in the torus has a location in the torus that is uniquely specified by a set of x, y, z coordinates. Readers will note that the wrap-around links in the y and z directions have been omitted for clarity, but are configured in a similar manner to the wrap-around link illustrated in the x direction. For clarity of explanation, the data communications network of FIG. 4 is illustrated with only 27 compute nodes, but readers will recognize that a data communications network optimized for point-to-point operations for use in token-based flow control of messages in a parallel computer in accordance with embodiments of the present invention may contain only a few compute nodes or may contain thousands of compute nodes. For ease of explanation, the data communications network of FIG. 4 is illustrated with only three dimensions, but readers will recognize that a data communications network optimized for point-to-point operations for use in token-based flow control of messages in a parallel computer in accordance with embodiments of the present invention may in fact be implemented in two dimensions, four dimensions, five dimensions, and so on. Several supercomputers now use five dimensional mesh or torus networks, including, for example, IBM's Blue Gene Q™.

Figure 5:
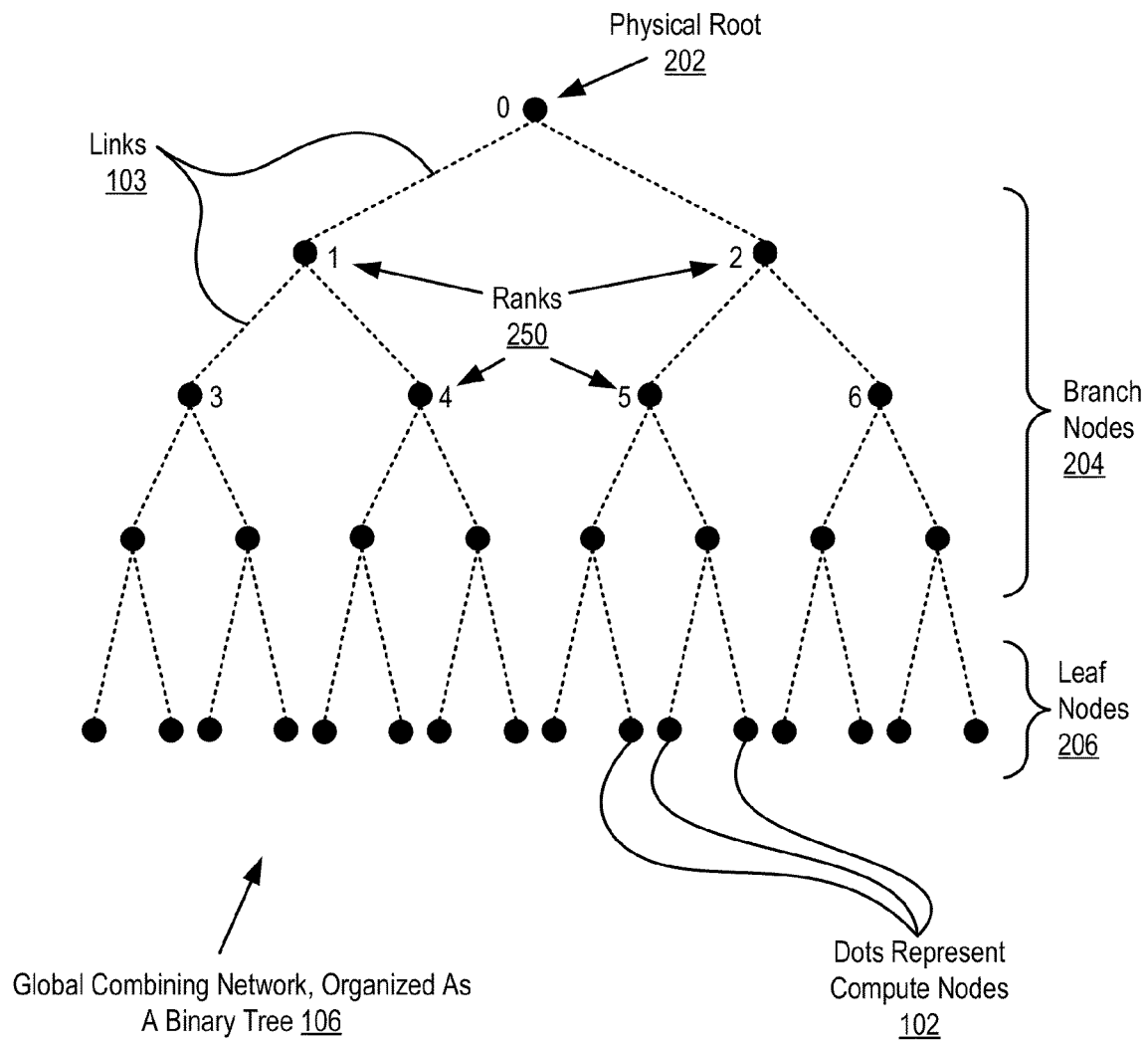
FIG. 5 sets forth a line drawing illustrating an example global combining network useful in systems capable of token-based flow control of messages in a parallel computer according to embodiments of the present invention.

For further explanation, FIG. 5 sets forth a line drawing illustrating an example global combining network (106) useful in systems capable of token-based flow control of messages in a parallel computer according to embodiments of the present invention. The example data communications network of FIG. 5 includes data communications links (103) connected to the compute nodes so as to organize the compute nodes as a tree. In the example of FIG. 5, dots represent compute nodes (102) of a parallel computer, and the dotted lines (103) between the dots represent data communications links between compute nodes. The data communications links are implemented with global combining network adapters similar to the one illustrated for example in FIG. 3B, with each node typically providing data communications to and from two children nodes and data communications to and from a parent node, with some exceptions. Nodes in the global combining network (106) may be characterized as a physical root node (202), branch nodes (204), and leaf nodes (206). The physical root (202) has two children but no parent and is so called because the physical root node (202) is the node physically configured at the top of the binary tree. The leaf nodes (206) each has a parent, but leaf nodes have no children. The branch nodes (204) each has both a parent and two children. The links and compute nodes are thereby organized by this data communications network optimized for collective operations into a binary tree (106). For clarity of explanation, the data communications network of FIG. 5 is illustrated with only 31 compute nodes, but readers will recognize that a global combining network (106) optimized for collective operations for use in token-based flow control of messages in a parallel computer in accordance with embodiments of the present invention may contain only a few compute nodes or may contain thousands of compute nodes.

In the example of FIG. 5, each node in the tree is assigned a unit identifier referred to as a 'rank' (250). The rank actually identifies a task or process that is executing a parallel operation. Using the rank to identify a node assumes that only one such task is executing on each node. To the extent that more than one participating task executes on a single node, the rank identifies the task as such rather than the node. A rank uniquely identifies a task's location in the tree network for use in both point-to-point and collective operations in the tree network. The ranks in this example are assigned as integers beginning with 0 assigned to the root tasks or root node (202), 1 assigned to the first node in the second layer of the tree, 2 assigned to the second node in the second layer of the tree, 3 assigned to the first node in the third layer of the tree, 4 assigned to the second node in the third layer of the tree, and so on. For ease of illustration, only the ranks of the first three layers of the tree are shown here, but all compute nodes in the tree network are assigned a unique rank.

Figure 6:
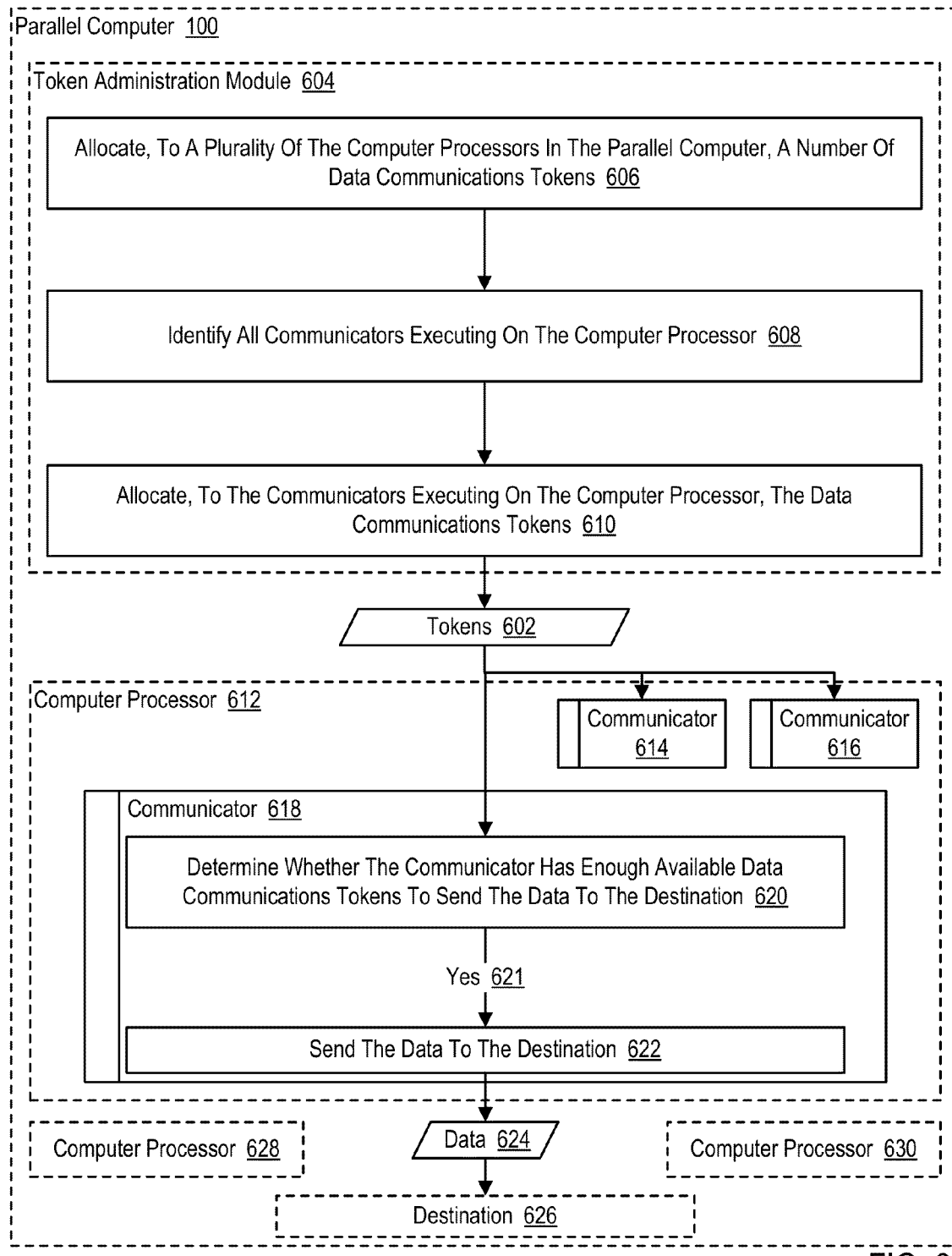
FIG. 6 sets forth a flow chart illustrating an example method for token-based flow control of messages in a parallel computer according to embodiments of the present invention.

For further explanation, FIG. 6 sets forth a flow chart illustrating an example method for token-based flow control of messages in a parallel computer (100) according to embodiments of the present invention. The parallel computer (100) of FIG. 6 is similar to the parallel computer described above with reference to FIGS. 1-5, as the parallel computer (100) includes a plurality of compute nodes (102 of FIG. 1) operatively coupled for data communications over one or more data communications networks (104, 106, 108, and 174 of FIG. 1). Each compute node (102 of FIG. 1) includes one or more computer processors (612, 628, 630).

In the example method of FIG. 6, each computer processor (612, 628, 630) supports the execution of one or more communicators (614, 616, 618). Each communicator (614, 616, 618) in FIG. 6 represents a set of computer program instructions that, when executed by a computer processor (612, 628, 630), can generated data communications messages. A particular communicator (614, 616, 618) may include computer program instructions for executing a parallel operation on the parallel computer (100), computer program instructions for performing collective operations on the parallel computer (100), and so on.

The parallel computer (100) of FIG. 6 also includes a token administration module (604). In the example method of FIG. 6, the token administration module (604) may be embodied as a set of computer program instructions executing on computer hardware for managing the use of data communications tokens (602). Each data communications token (602) in FIG. 6 represents an amount of data that communicators (614, 616, 618) executing on a particular computer processor (612) may send to a destination (626). In the example method of FIG. 6, the amount of data that communicators (614, 616, 618) executing on the computer processor (612) may send to a destination (626) may be expressed, for example, in terms of kilobytes (KBs), megabytes (MBs), messages, and in other units of measure that will occur to those of skill in the art.

The example method of FIG. 6 includes allocating (606), by the token administration module to a plurality of the computer processors (612, 628, 630) in the parallel computer (100), a number of data communications tokens (602). Because each data communications token (602) that is allocated (606) to each processor (612, 628, 630) represents an amount of data that may be sent from all communicators (614, 616, 618) that are executing on a single computer processor (612, 628, 630), the total number of data communications token (602) that are allocated (606) to each processor (612, 628, 630) represents the total amount of data that may be sent from all communicators (614, 616, 618) that are executing on a single computer processor (612, 628, 630). In the example method of FIG. 6, the token administration module (604) may limit the amount of data communications messages that are sent to a destination (626) by limiting the number of data communications tokens (602) that are allocated (606) to each computer processor (612, 628, 630).

In the example method of FIG. 6, the number of data communications tokens (602) that are allocated (606) to each processor (612, 628, 630) is determined in dependence upon token distribution rules. In the example method of FIG. 6, the token distribution rules may be configured to calculate the number of data communications tokens (602) that are allocated (606) to each processor (612, 628, 630) in dependence upon network conditions of the one or more data communications networks in the parallel computer (100). In such a way, the token administration module (604) can limit the amount of data communications that occurs over the one more data communications networks to supportable level by limiting the amount of data communications that each communicator (614, 616, 618) may generate.

In the example method of FIG. 6, the token distribution rules may also be configured to calculate the number of data communications tokens (602) that are allocated (606) to each processor (612, 628, 630) in dependence upon distribution thresholds designed to avoid allocating a disproportionate percentage of communications tokens (602) to a single processor (612, 628, 630). In such a way, the token administration module (604) can limit the amount of data communications that are generated by a single computer processor (612, 628, 630) and can ensure that all computer processors (612, 628, 630) can perform data communications operations. Readers will appreciate that in a parallel computer (100) in which extremely large numbers of computer processors may be sending messages, receiving messages, and otherwise performing data communications operations, the token distribution rules may be configured to account for a number of factors so as to control the flow of data communications messages across the data communications networks in the parallel computer (100).

The example method of FIG. 6 also includes identifying (608), by the token administration module (604), all communicators (614, 616, 618) executing on the computer processor (612). In the example method of FIG. 6, each communicator (614, 616, 618) is participating in a distinct parallel operation executing on the parallel computer (100). Such parallel operations may include, for example, collective operations as described above or any other operation in which multiple processors distributed across multiple compute nodes perform some portion of the computing required to execute the collective operation.

In the example method of FIG. 6, identifying (608) all communicators (614, 616, 618) executing on the computer processor (612) may be carried out, for example, through the use of a registration process. In such an example, each communicator (614, 616, 618) executing on the computer processor (612) may register with the token administration module (604) upon initiation. That is, each process that executes on the computer processor (612) that includes computer program instructions for sending data communications messages to a destination (626) may be configured such that the process registers with the token administration module (604) in order to receive data communications tokens (602).

The example method of FIG. 6 also includes allocating (610), by the token administration module (604) to the communicators (614, 616, 618) executing on the computer processor (612), the data communications tokens (602). In the example method of FIG. 6, allocating (610) the data communications tokens (602) to the communicators (614, 616, 618) executing on the computer processor (612) may be carried out, for example, according to token allocation rules. In such an example, data communications tokens (602) may be allocated to the communicators (614, 616, 618) executing on the computer processor (612), for example, in dependence upon the number of messages that a particular communicator (614, 616, 618) expects to send, in dependence upon the number of messages that a particular communicator (614, 616, 618) expects to receive, in dependence upon the number of data communications tokens (602) requested by each communicator (614, 616, 618), in dependence upon the location of the computer processor (612) in a data communications network, and so on. In such a way, each computer processor (612) may determine the amount of data communications tokens (602) to allocate (610) to each of the communicators (614, 616, 618) executing on the computer processor (612).

The example method of FIG. 6 also includes determining (620), by a communicator (618) attempting to send data (624) to the destination (626), whether the communicator (618) has enough available data communications tokens (602) to send the data (624) to the destination (626). In the example method of FIG. 6, determining (620) whether the communicator (618) has enough available data communications tokens (602) to send the data (624) to the destination (626) may be carried out, for example, by determining the size of the data (624) to be sent to the destination (626) and determining the amount of data that the communicator (618) may send to a destination (626) by using the data communications tokens (602). Consider an example in which the communicator (618) intends to send 5 MB of data (624) to the destination (626), and the communicator (618) has six available data communications tokens (602), each of which specifies that the communicator (618) can send 1 MB of data to the destination (626). In such an example the communicator (618) attempting to send data (624) to the destination (626) can determine (620) that the communicator does (621) have enough available data communications tokens (602) to send the data (624) to the destination (626).

The example method of FIG. 6 also includes sending (622), by the communicator (618), the data (624) to the destination (626). In the example method of FIG. 6, sending (622) the data (624) to the destination (626) occurs in response to determining that the communicator (618) has enough available data communications tokens (602) to send (622) the data (624) to the destination (626). In the example method of FIG. 6, sending (622) the data (624) to the destination (626) may be carried out, for example, by the communicator (618) initiating a data communications message to the destination (626). Such a data communications message may be transmitted, for example, over a data communications network such as the torus network, the global combining network, or other network that couples communicators (618) in the parallel computer (100) to destinations (626) in the parallel computer (100).

Figure 7:
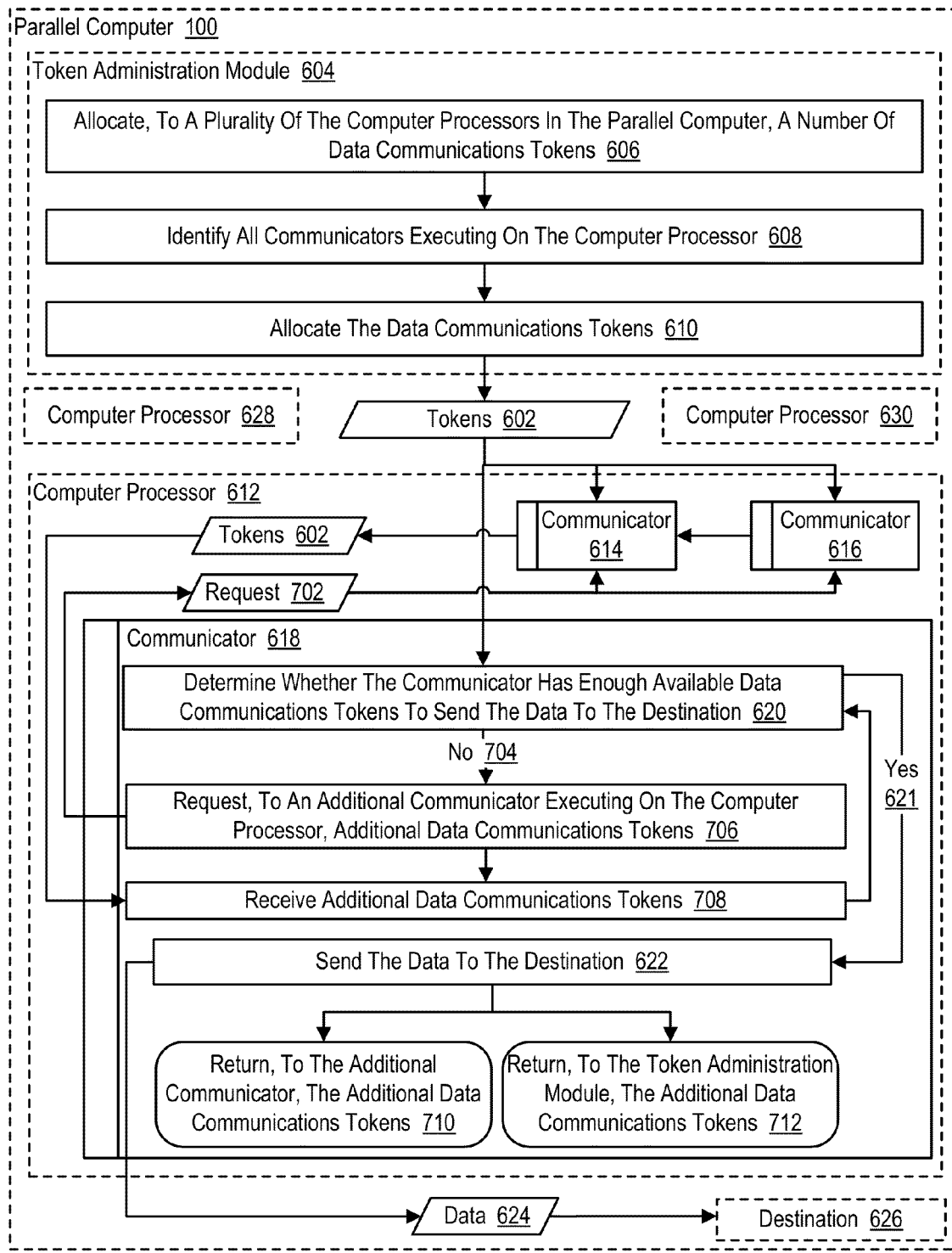
FIG. 7 sets forth a flow chart illustrating an additional example method for token-based flow control of messages in a parallel computer according to embodiments of the present invention.

For further explanation, FIG. 7 sets forth a flow chart illustrating an additional example method for token-based flow control of messages in a parallel computer (100) according to embodiments of the present invention. The example method of FIG. 7 is similar to the example method of FIG. 6, as it also includes allocating (606) a number of data communications tokens (602) to each computer processor (612, 628, 630), identifying (608) all communicators (614, 616, 618) executing on the computer processors (612, 628, 630), allocating (610) the data communications tokens (602) to the communicators (614, 616, 618), determining (620) whether the communicator (618) has enough available data communications tokens (602) to send the data (624) to the destination (626), and sending (622) the data (624) to the destination (626).

The example method of FIG. 7 also includes requesting (706), by the communicator (618) to an additional communicator (614, 616) executing on the computer processor (612), additional data communications tokens (602). In the example method of FIG. 7, requesting (706) additional data communications tokens (602) occurs in response to determining that the communicator does not have enough available data communications tokens (602) to send the data (624) to the destination (626). In the example method of FIG. 7, requesting (706) additional data communications tokens (602) may be carried out, for example, by requesting additional data communications tokens (602) from a predetermined list of candidate additional communicators (614, 616), by requesting additional data communications tokens (602) from candidate additional communicators (614, 616) that have indicated that they have available data communications tokens (602), and so on. In the example method of FIG. 7, the communicator (618) may request additional data communications tokens (602) by sending a request (702) to the additional communicators (614, 616). Such a request (702) may include, for example, an identification of the requesting communicator (618), an indication of the number of requested data communications tokens (602), and indication of the size of the data (624) to be sent to the destination (626), and so on.

The example method of FIG. 7 also includes receiving (708), by the communicator (618), additional data communications tokens (602). In the example method of FIG. 7, any number of additional data communications tokens (602) may be received (708) from the additional communicators (614, 616). Readers will appreciate that the communicator (618) may receive (708) a number of additional data communications tokens (602) that is sufficient for the communicator (618), in combination with the data communications tokens (602) already possessed by the communicator (618), for the communicator (618) to send (622) the data (624) to the destination (626). Alternatively, the communicator (618) may receive (708) a number of additional data communications tokens (602) from a particular additional communicator (614) that is insufficient for the communicator (618) to send (622) the data (624) to the destination (626). As such, readers will appreciate that the communicator (618) may request additional data communications tokens (602) from one or more communicators (614, 616) at a time, from one or more communicators (614, 616) until a sufficient number of additional data communications tokens (602) are received (708), or any combination thereof.

The example method of FIG. 7 also includes returning (710), from the communicator (618) to the additional communicator (614, 616), the additional data communications tokens (602). In the example method of FIG. 7, once the communicator (618) has sent (622) the data (624) to the destination (626), the communicator (618) may release the additional data communications tokens (602) that were received (708) in order to send (622) the data (624) to the destination (626). In such an example, the communicator (618) may return (710) the additional data communications tokens (602) to the additional communicator (614, 616) that sent the additional data communications tokens (602) to the communicator (618).

The example method of FIG. 7 can alternatively include returning (712), from the communicator (618) to the token administration module (604), the additional data communications tokens (602). As described above, once the communicator (618) has sent (622) the data (624) to the destination (626), the communicator (618) may release the additional data communications tokens (602) that were received (708) in order to send (622) the data (624) to the destination (626). In such an example, the communicator (618) may return (712) the additional data communications tokens (602) to the token administration module (604) to be allocated (610) to any of the communicators (614, 616, 618).

Figure 8:
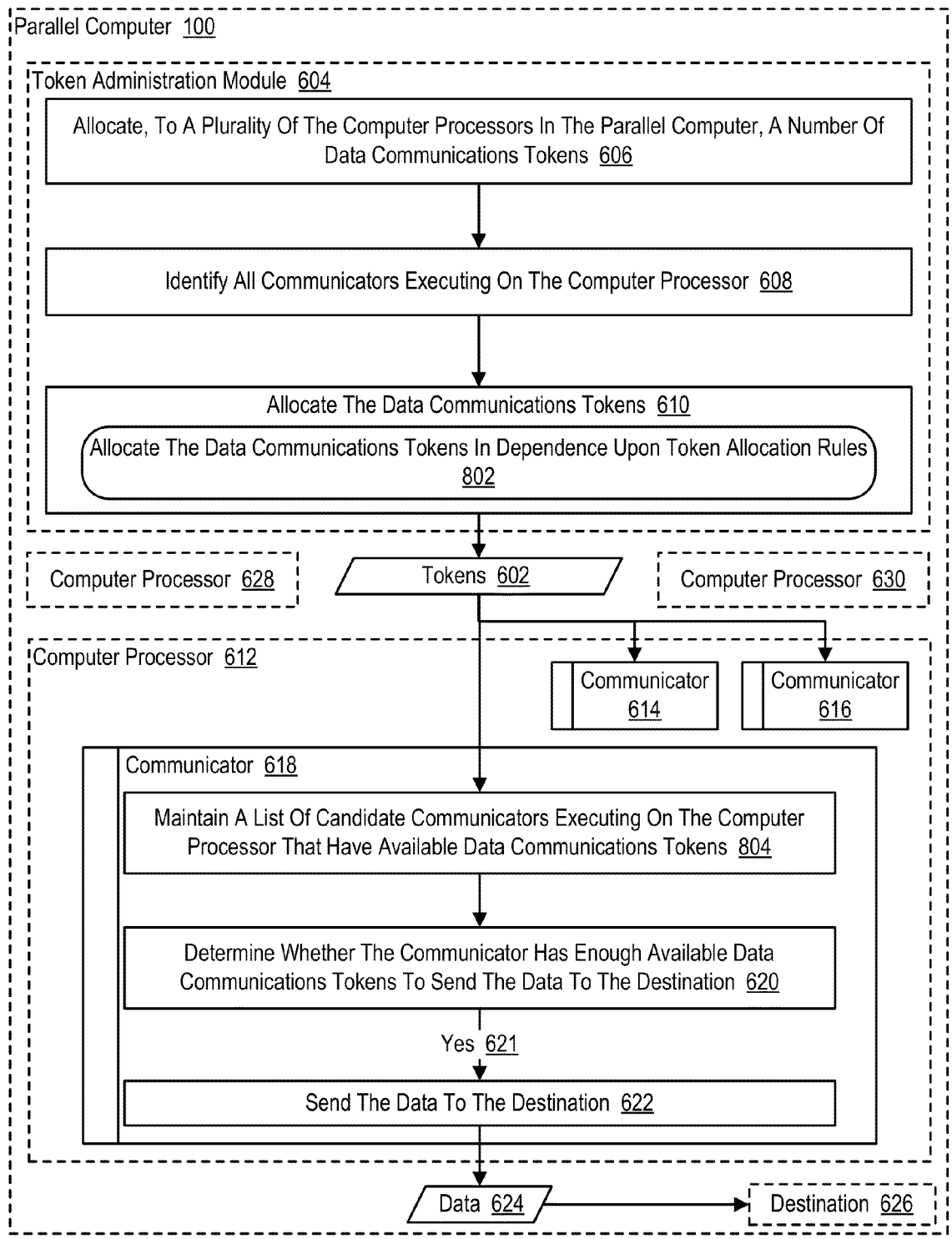
FIG. 8 sets forth a flow chart illustrating an additional example method for token-based flow control of messages in a parallel computer according to embodiments of the present invention.

For further explanation, FIG. 8 sets forth a flow chart illustrating an additional example method for token-based flow control of messages in a parallel computer (100) according to embodiments of the present invention. The example method of FIG. 8 is similar to the example method of FIG. 6, as it also includes allocating (606) a number of data communications tokens (602) to each computer processor (612, 628, 630), identifying (608) all communicators (614, 616, 618) executing on the computer processors (612, 628, 630), allocating (610) the data communications tokens (602) to the communicators (614, 616, 618), determining (620) whether the communicator (618) has enough available data communications tokens (602) to send the data (624) to the destination (626), and sending (622) the data (624) to the destination (626).

In the example method of FIG. 8, allocating (610) the data communications tokens (602) also includes allocating (802) the data communications tokens (602) in dependence upon token allocation rules. In such an example, data communications tokens (602) may be allocated (802) to the communicators (614, 616, 618) executing on the computer processor (612), for example, in dependence upon the number of messages that a particular communicator (614, 616, 618) expects to send, in dependence upon the number of messages that a particular communicator (614, 616, 618) expects to receive, in dependence upon the number of data communications tokens (602) requested by each communicator (614, 616, 618), in dependence upon the location of the computer processor (612) in a data communications network, and so on. In such a way, each computer processor (612) may determine the amount of data communications tokens (602) to allocate (802) to each of the communicators (614, 616, 618) executing on the computer processor (612).

The example method of FIG. 8 also includes maintaining (804), by each communicator (614, 616, 618) executing on the computer processor (612), a list of candidate communicators (614, 616, 618) executing on the computer processor (612) that have available data communications tokens (602). In the example method of FIG. 8, maintaining (804) a list of candidate communicators (614, 616, 618) executing on the computer processor (612) that have available data communications tokens (602) may be carried out, for example, by updating the list with the data communications tokens (602) are initially allocated (610) to the communicators (614, 616, 618) and updating this list each time a communicator (614, 616, 618) sends messages, thereby using one or more of the data communications tokens (602). In such an example, maintaining (804) a list of candidate communicators (614, 616, 618) executing on the computer processor (612) that have available data communications tokens (602) may also include updating the list when data communications tokens (602) are exchanged between communicators (614, 616, 618), and so on. In such an example, the list may include an entry for each communicator (614, 616, 618) that identifies the number of data communications tokens (602) possessed by the communicator (614, 616, 618). In such an example, a particular communicator in need of data communications tokens (602) may use the list to identify the communicators (614, 616, 618) that have available data communications tokens (602), and to identify the communicators (614, 616, 618) that a request for data communications tokens (602) can be sent to.

Example embodiments of the present invention are described largely in the context of a fully functional computer system for token-based flow control of messages in a parallel computer. Readers of skill in the art will recognize, however, that the present invention also may be embodied in a computer program product disposed upon computer readable storage media for use with any suitable data processing system. Such computer storage media may be any storage medium for machine-readable information, including magnetic media, optical media, or other suitable media. Examples of such media include magnetic disks in hard drives or diskettes, compact disks for optical drives, magnetic tape, and others as will occur to those of skill in the art. Persons skilled in the art will immediately recognize that any computer system having suitable programming means will be capable of executing the steps of the method of the invention as embodied in a computer program product. Persons skilled in the art will recognize also that, although some of the example embodiments described in this specification are oriented to software installed and executing on computer hardware, nevertheless, alternative embodiments implemented as firmware or as hardware are well within the scope of the present invention.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It will be understood from the foregoing description that modifications and changes may be made in various embodiments of the present invention without departing from its true spirit. The descriptions in this specification are for purposes of illustration only and are not to be construed in a limiting sense. The scope of the present invention is limited only by the language of the following claims.

What is claimed is:

1. A method of token-based flow control of messages in a parallel computer executing a plurality of parallel operations, the parallel computer including a plurality of compute nodes operatively coupled for data communications over one or more data communications networks, each compute node including one or more computer processors, the method comprising:
   allocating, by a token administration module to a plurality of the computer processors in the parallel computer, a number of data communications tokens, wherein:
      each data communications token represents an amount of data that a computer processor may send to a destination; and
      the number of data communications tokens allocated to each computer processor is determined in dependence upon token distribution rules;
   identifying, by the token administration module for each computer processor, all communicators executing on the computer processor, wherein each communicator is participating in a distinct parallel operation executing on the parallel computer;
   allocating, by the token administration module to the communicators, the data communications tokens;
   determining, by a communicator attempting to send data to the destination, whether the communicator has enough available data communications tokens to send the data to the destination; and
   responsive to determining that the communicator has enough available data communications tokens to send the data, sending, by the communicator, the data to the destination.

2. The method of claim 1 further comprising responsive to determining that the communicator does not have enough available data communications tokens to send the data to the destination, requesting, by the communicator to an additional communicator executing on the computer processor, additional data communications tokens.

3. The method of claim 2 further comprising receiving, by the communicator, additional data communications tokens.

4. The method of claim 3 further comprising returning, from the communicator to the additional communicator, the additional data communications tokens.

5. The method of claim 3 further comprising returning, from the communicator to the token administration module, the additional data communications tokens.

6. The method of claim 1 wherein allocating the data communications tokens further comprises allocating the data communications tokens in dependence upon token allocation rules.

7. The method of claim 1 further comprising maintaining, by each communicator executing on the computer processor, a list of candidate communicators executing on the computer processor that have available data communications tokens.

* * * * *